UNITED STATES PATENT OFFICE.

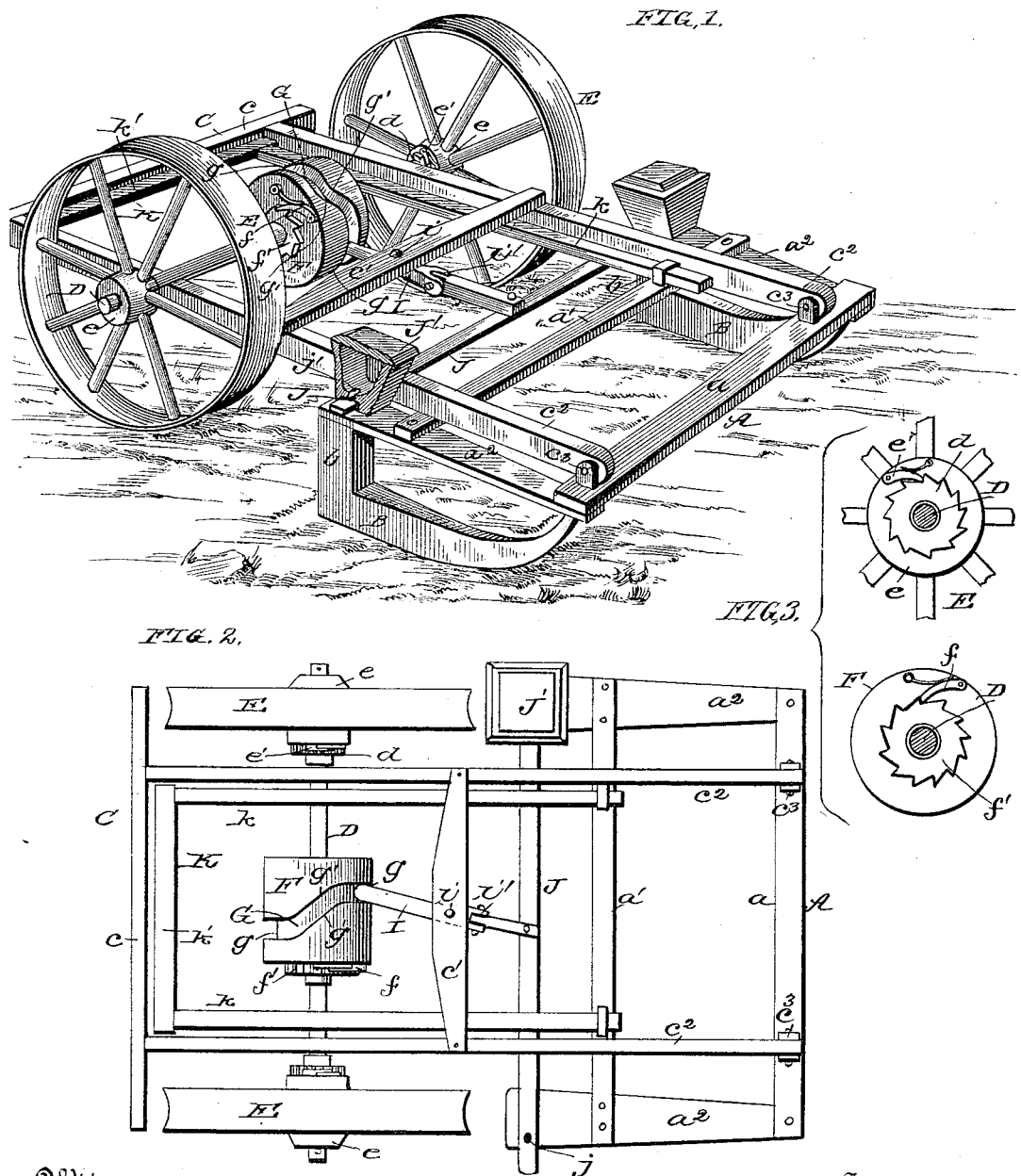

MATHEW SHANKS AND FRANK DAILY, OF CINCINNATI, IOWA.

CORN-PLANTER.

SPECIFICATION forming part of Letters Patent No. 363,007, dated May 17, 1887.

Application filed February 26, 1887. Serial No. 229,033. (No model.)

*To all whom it may concern:*

Be it known that we, MATHEW SHANKS and FRANK DAILY, citizens of the United States, residing at Cincinnati, in the county of Appanoose and State of Iowa, have invented new and useful Improvements in Corn and Seed Planters, of which the following is a specification.

The invention relates to improvements in corn and seed planters, and refers more particularly to the mechanism whereby the seed-slide is automatically actuated in such manner as to cause the seed to drop from the seed-boxes simultaneously at regular intervals; and it consists in the construction and novel arrangement of parts, hereinafter described, illustrated in the drawings, and pointed out in the claim hereto appended.

In the accompanying drawings, Figure 1 represents a perspective view of the invention, showing the ratchet-wheel and pawl of the cam-cylinder. Fig. 2 shows a plan view of the same; and Fig. 3 is a detail view of the ratchet-wheels.

Referring to the drawings, A represents the furrow-opener frame, composed of the front and rear transverse rails, $a$ $a'$, respectively, and the side rails $a^2$ $a^2$, connecting the ends of the former.

B B are the furrow-openers, of usual construction, curving downward and rearward to the rear end of the frame A, when they are secured to the lower ends of the parts $b$ $b$ depending from said frame.

C is the main frame of the machine, composed of the transverse rails $c$ $c'$ and the side rail $c^2$ $c^2$, which are extended in front of the rails $c'$, above the frame A, and have their front ends pivoted between the lugs $c^3 c^3$, standing upward from the front rail, $a$, of said frame, as shown.

D is the axle, journaled in bearings secured to the side rails $c^2$ between the rails $c$ $c'$, and having on its extended ends the wheels E, the hubs $e$ of which turn loosely thereon.

Secured to the axle adjacent to the hub of each wheel is a ratchet-wheel, $d$, engaged by a spring-controlled pawl, $e'$, pivoted upon the inner end of the hub in such manner that when the wheels roll forward the axle is compelled to turn therewith, the teeth of the ratchet-wheels pointing backward. Should the motion of the wheels be reversed, however, the ratchet-wheels and pawls allow them to turn without rotating the axle.

F is a cam-cylinder turning loosely on the central part of the axle and having pivoted on one end the spring-controlled pawl $f$, engaging the ratchet-wheel $f'$, the teeth of which point forward. The said ratchet-wheel is secured to the axle, and when the latter rotates forward the ratchet, by means of its pawl, causes the cam-cylinder to rotate therewith. Should the motion of the axle be reversed, the teeth of the ratchet will slip under the pawl, and the cam-cylinder will cease to rotate.

G is a circumferential cam-groove in the cylinder F, which groove is composed of the diametrically-opposite parts $g$ $g$, parallel and adjacent to opposite ends of the cam-cylinder, and the diametrically-opposite inclined parts $g'$ $g'$.

I is an actuating cam-lever, pivoted at $i$ upon the central part of the bar $c'$, and having the end of its rear arm in the cam-groove G. The end of the front arm of the cam-lever I is pivoted centrally upon the seed-slide J, the ends of which rest upon the rails $a^2$ $a^2$ of the furrow-opener frame or runner frame A, and have in them the openings $j$, which pass under the openings $j'$ in the seed-boxes J', when the end of the rear arm is midway in the inclined parts $g'$ of the cam-groove G. The front arm of the cam-lever is provided with a joint, $i'$, permitting vertical motion, so as to allow the cam-lever to accommodate itself to the vertical motion of the runner-frame on the main frame.

K is a rectangular frame, composed of the side rails $k$ and the transverse rail $k'$ at the rear end of the same. The front ends of the rails $k$ are secured in staples on the rail $a'$ of the runner-frame, or otherwise stiffly attached thereto. The said rails $k$ rest on the inner side of the rails $c^2$ of the main frame, and prevent the runner-frame from having lateral motion thereon.

The planter, as shown and described, is of simple, strong, and durable construction, is effective in action, and will rarely need repair. The arrangement of the cam-groove causes two plantings to take place during one rotation of the wheel. The plantings on each side are consequently a distance apart equal to the circumference of one of the wheels.

Having described our invention, we claim—

In a planter, the combination of the main frame and axle journaled thereon, the ratchet-wheels $d$ $d$ and $f'$, secured to the axle, the wheels turning loosely on the axle, the spring-controlled pawls $e'$ $e'$, pivoted on the hubs of the wheels to engage the ratchet-wheels $d$ $d$, the cam-cylinder turning loosely on the axle and provided with the cam-groove G, the spring-controlled pawl $f$, pivoted upon one end of the cam-cylinder, to be engaged by the ratchet-wheel $f'$, and thereby impart motion to the cylinder, and the lever pivoted to the main frame and having its rear arm engaged by the cam-groove G and its front arm pivoted at its end to the center of the seed-slide, and provided with a joint, $i'$, between the pivot and its front end, substantially as specified.

In testimony that we claim the foregoing as our own we have hereto affixed our signatures in presence of two witnesses.

MATHEW SHANKS.
FRANK DAILY.

Witnesses:
JAMES WALFINGER,
J. C. MCDONALD.